United States Patent
Bose et al.

(10) Patent No.: US 12,451,493 B2
(45) Date of Patent: Oct. 21, 2025

(54) BATTERY GRID

(71) Applicant: CPS Technology Holdings LLC, New York, NY (US)

(72) Inventors: Deepan C. Bose, Milwaukee, WI (US); Jeffrey L. Troxel, Menomonee Falls, WI (US); Michael E. La Croix; Fabio F. Peluso, Cedarburg, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 16/481,355

(22) PCT Filed: Jan. 26, 2018

(86) PCT No.: PCT/US2018/015426
§ 371 (c)(1),
(2) Date: Jul. 26, 2019

(87) PCT Pub. No.: WO2018/140713
PCT Pub. Date: Aug. 2, 2018

(65) Prior Publication Data
US 2019/0393512 A1    Dec. 26, 2019

Related U.S. Application Data

(60) Provisional application No. 62/488,388, filed on Apr. 21, 2017, provisional application No. 62/451,590, filed on Jan. 27, 2017.

(51) Int. Cl.
*H01M 4/73*    (2006.01)
*H01M 4/68*    (2006.01)
(Continued)

(52) U.S. Cl.
CPC .......... *H01M 4/742* (2013.01); *H01M 4/685* (2013.01); *H01M 4/73* (2013.01); *H01M 50/437* (2021.01);
(Continued)

(58) Field of Classification Search
CPC ........ H01M 4/742; H01M 4/685; H01M 4/73; H01M 50/409; H01M 50/463; H01M 4/72; H01M 2300/0005
See application file for complete search history.

(56) References Cited

U.S. PATENT DOCUMENTS 345,511 A    7/1886    Khotinsky
487,834 A    12/1892   Griscom
(Continued)

FOREIGN PATENT DOCUMENTS

CN    1279824 A    1/2001
CN    1391303 A    1/2003
(Continued)

OTHER PUBLICATIONS

International Search Report and Written Opinion of the International Searching Authority dated Mar. 14, 2018 for PCT/US2018/015426 filed Jan. 26, 2018, 12 pages.
(Continued)

*Primary Examiner* — Dustin Q Dam
(74) *Attorney, Agent, or Firm* — Boardman & Clark LLP

(57) ABSTRACT

A grid for an absorbent glass mat lead acid battery is also disclosed. The grid has a frame formed of a top frame element having a current collection lug, a first side frame element, a second side frame element, and a bottom frame element. A plurality of grid wires are arranged in radial configuration within the frame which radial configuration emanates from a radiant point located outside a boundary of the frame. A plurality of horizontal grid wires cross the
(Continued)

plurality of grid wires arranged the radial configuration. The grid comprises virgin lead or high purity lead or highly purified secondary lead. An absorbent glass mat lead acid battery is also disclosed.

18 Claims, 9 Drawing Sheets

(51) Int. Cl.
  *H01M 4/74* (2006.01)
  *H01M 50/437* (2021.01)
  *H01M 50/463* (2021.01)

(52) U.S. Cl.
  CPC .. *H01M 50/463* (2021.01); *H01M 2300/0005* (2013.01)

(56) References Cited

U.S. PATENT DOCUMENTS

| | | |
|---|---|---|
| 669,085 A | 3/1901 | Heidel |
| 1,129,690 A | 2/1915 | Knobloch |
| 1,347,873 A | 7/1920 | Rabe |
| 1,364,760 A | 1/1921 | Holland et al. |
| 1,381,008 A | 6/1921 | Polk |
| 1,408,579 A | 3/1922 | Garrett |
| 1,500,219 A | 7/1924 | Benner |
| 1,524,610 A | 1/1925 | Ahlgren |
| 1,528,963 A | 3/1925 | Adams et al. |
| 1,600,083 A | 9/1926 | Webster |
| 1,675,644 A | 7/1928 | Reginald et al. |
| 1,947,473 A | 2/1934 | Huebner |
| 1,983,611 A | 12/1934 | Jackson |
| 2,060,534 A | 11/1936 | Singleton et al. |
| 2,079,727 A | 5/1937 | Wirtz |
| 2,148,371 A | 2/1939 | Galloway |
| 2,193,782 A | 3/1940 | Smith |
| 2,261,053 A | 10/1941 | De Martis et al. |
| 2,282,760 A | 5/1942 | Hauel |
| 2,503,970 A | 4/1950 | Rupp |
| 2,727,079 A | 12/1955 | Chubb et al. |
| 2,821,565 A | 1/1958 | Lander et al. |
| 2,881,105 A | 4/1959 | Gullett |
| 2,882,568 A | 4/1959 | Leaberry et al. |
| 2,882,760 A | 4/1959 | Leifer |
| 3,009,459 A | 11/1961 | Ruben |
| 3,023,468 A | 3/1962 | Hord et al. |
| 3,249,981 A | 5/1966 | Sabatino |
| 3,349,087 A | 10/1967 | Hill et al. |
| 3,398,024 A | 8/1968 | Bares et al. |
| 3,408,236 A | 10/1968 | Hartesveldt |
| 3,453,145 A | 7/1969 | Duddy |
| 3,466,193 A | 9/1969 | Hughel |
| 3,486,942 A | 12/1969 | Hatterschide |
| 3,534,803 A | 10/1970 | Bickerdike et al. |
| 3,556,853 A | 1/1971 | Cannone |
| 3,556,854 A | 1/1971 | Wheadon et al. |
| 3,579,386 A | 5/1971 | Tiegel et al. |
| 3,629,388 A | 12/1971 | Wolf et al. |
| 3,710,430 A | 1/1973 | Long et al. |
| 3,723,181 A | 3/1973 | Oakley |
| 3,761,047 A | 9/1973 | Mao |
| 3,779,816 A | 12/1973 | Mao |
| 3,853,626 A | 12/1974 | Daniels et al. |
| 3,909,293 A | 9/1975 | Hammond et al. |
| 3,923,545 A | 12/1975 | Marguiles et al. |
| 3,926,247 A | 12/1975 | Geiger |
| 3,929,513 A | 12/1975 | Mao |
| 3,933,335 A | 1/1976 | Maruyama et al. |
| 3,933,524 A | 1/1976 | Hughel et al. |
| 3,945,097 A | 3/1976 | Daniels, Jr. et al. |
| 3,947,936 A | 4/1976 | Wheadon |
| 3,951,688 A | 4/1976 | Pankow et al. |
| 3,959,016 A | 5/1976 | Tsuda |
| 3,989,539 A | 11/1976 | Grabb |
| 4,016,633 A | 4/1977 | Smith et al. |
| 4,022,951 A | 5/1977 | McDowall |
| 4,048,397 A | 9/1977 | Rothbauer |
| 4,050,502 A | 9/1977 | Allyn et al. |
| 4,080,727 A | 3/1978 | Stolle et al. |
| 4,097,625 A | 6/1978 | Lunn et al. |
| 4,107,407 A | 8/1978 | Koch |
| 4,118,553 A | 10/1978 | Buckethal et al. |
| 4,140,840 A | 2/1979 | Ruben |
| 4,151,331 A | 4/1979 | Hug et al. |
| 4,159,908 A | 7/1979 | Rao et al. |
| 4,189,533 A | 2/1980 | Sugalski |
| 4,196,757 A | 4/1980 | Hug et al. |
| 4,196,769 A | 4/1980 | Fengin |
| 4,199,849 A | 4/1980 | Moreau |
| 4,221,032 A | 9/1980 | Cousino et al. |
| 4,221,852 A | 9/1980 | Qureshi |
| 4,291,443 A | 9/1981 | Laurie et al. |
| 4,297,866 A | 11/1981 | Sakauye et al. |
| 4,303,747 A | 12/1981 | Bender |
| 4,305,187 A | 12/1981 | Iwamura et al. |
| 4,315,356 A | 2/1982 | Laurie et al. |
| 4,315,829 A | 2/1982 | Duddy et al. |
| 4,317,351 A | 3/1982 | Borrows |
| 4,320,183 A | 3/1982 | Quershi |
| 4,327,163 A | 4/1982 | Wheadon |
| 4,345,452 A | 8/1982 | Eberle |
| 4,349,067 A | 9/1982 | Wirtz et al. |
| 4,351,891 A | 9/1982 | McCartney, Jr. et al. |
| 4,353,969 A | 10/1982 | Rippel et al. |
| 4,358,892 A | 11/1982 | Turillon et al. |
| 4,386,987 A | 6/1983 | Covitch et al. |
| 4,407,063 A | 10/1983 | Johnson |
| 4,443,918 A | 4/1984 | Morinari et al. |
| 4,455,724 A | 6/1984 | Sperling et al. |
| 4,460,666 A | 7/1984 | Dinkler et al. |
| 4,462,745 A | 7/1984 | Johnson et al. |
| 4,477,546 A | 10/1984 | Wheeler et al. |
| 4,498,519 A | 2/1985 | Watanabe et al. |
| 4,528,255 A | 7/1985 | Hayes et al. |
| 4,548,882 A | 10/1985 | Shima et al. |
| 4,555,459 A | 11/1985 | Anderson et al. |
| 4,606,383 A | 8/1986 | Yank |
| 4,614,630 A | 9/1986 | Pluim, Jr. |
| 4,629,516 A | 12/1986 | Myers |
| 4,683,180 A | 7/1987 | Bish et al. |
| 4,758,126 A | 7/1988 | Johnson et al. |
| 4,761,352 A | 8/1988 | Bakos et al. |
| 4,761,356 A | 8/1988 | Kobayashi et al. |
| 4,782,585 A | 11/1988 | Kobayashi et al. |
| 4,805,277 A | 2/1989 | Yasuda et al. |
| 4,822,234 A | 4/1989 | Johnson et al. |
| 4,824,307 A | 4/1989 | Johnson et al. |
| 4,830,938 A | 5/1989 | McCullough et al. |
| 4,865,928 A | 9/1989 | Richter |
| 4,865,933 A | 9/1989 | Blanyer et al. |
| 4,882,234 A | 11/1989 | Lai et al. |
| 4,882,828 A | 11/1989 | McLoughlin et al. |
| 4,906,540 A | 3/1990 | Hoshihara et al. |
| 4,932,443 A | 6/1990 | Karolek et al. |
| 4,939,051 A | 7/1990 | Yasuda et al. |
| 4,982,482 A | 1/1991 | Wheadon et al. |
| 5,017,446 A | 5/1991 | Reichman et al. |
| 5,024,908 A | 6/1991 | Terada et al. |
| 5,093,970 A | 3/1992 | Senoo et al. |
| 5,098,799 A | 3/1992 | Bowen et al. |
| 5,139,902 A | 8/1992 | Drews et al. |
| 5,149,605 A | 9/1992 | Dougherty |
| 5,221,852 A | 6/1993 | Nagai et al. |
| 5,223,352 A | 6/1993 | Pitts et al. |
| 5,223,354 A | 6/1993 | Serioo et al. |
| 5,264,306 A | 11/1993 | Walker, Jr. et al. |
| 5,273,554 A | 12/1993 | Vyas |
| 5,308,719 A | 5/1994 | Mrotek et al. |
| 5,344,727 A | 9/1994 | Meadows et al. |
| 5,350,645 A | 9/1994 | Lake et al. |
| 5,384,217 A | 1/1995 | Binder et al. |
| 5,384,219 A | 1/1995 | Dao et al. |

(56) References Cited

U.S. PATENT DOCUMENTS

| | | |
|---|---|---|
| 5,434,025 A | 7/1995 | Rao et al. |
| 5,462,109 A | 10/1995 | Vincze |
| 5,506,062 A | 4/1996 | Flammang |
| 5,540,127 A | 7/1996 | Binder et al. |
| 5,543,250 A | 8/1996 | Yanagihara et al. |
| 5,578,398 A | 11/1996 | Jenkins et al. |
| 5,578,840 A | 11/1996 | Scepanovic et al. |
| 5,580,685 A | 12/1996 | Schenk |
| 5,582,936 A | 12/1996 | Mrotek et al. |
| 5,595,840 A | 1/1997 | Hanning et al. |
| 5,601,953 A | 2/1997 | Schenk |
| 5,604,058 A | 2/1997 | Wirtz |
| 5,611,128 A | 3/1997 | Wirtz |
| 5,643,696 A | 7/1997 | Rowlette |
| 5,660,600 A | 8/1997 | Vyas |
| 5,660,946 A | 8/1997 | Kump et al. |
| 5,691,087 A | 11/1997 | Rao et al. |
| 5,834,141 A | 11/1998 | Anderson et al. |
| 5,851,695 A | 12/1998 | Misra et al. |
| 5,858,575 A | 1/1999 | Chen |
| 5,874,186 A | 2/1999 | Rap et al. |
| 5,948,566 A | 9/1999 | Larsen et al. |
| 5,952,123 A | 9/1999 | Hatanaka et al. |
| 5,958,274 A | 9/1999 | Dobie et al. |
| 5,958,625 A | 9/1999 | Rao |
| 5,989,749 A | 11/1999 | Kao et al. |
| 6,026,722 A | 2/2000 | Lopez Ascaso et al. |
| 6,037,081 A | 3/2000 | Kashio et al. |
| 6,057,059 A | 5/2000 | Kwok et al. |
| RE36,734 E | 6/2000 | Binder et al. |
| 6,086,691 A | 7/2000 | Lehockey et al. |
| 6,117,594 A | 9/2000 | Taylor et al. |
| 6,122,820 A | 9/2000 | Dawood et al. |
| 6,180,286 B1 * | 1/2001 | Rao .............. H01M 4/685 |
| | | 429/245 |
| 6,203,948 B1 | 3/2001 | Kao et al. |
| 6,228,537 B1 | 5/2001 | Richter et al. |
| 6,232,017 B1 | 5/2001 | Tsuchida et al. |
| 6,232,018 B1 | 5/2001 | Zhao |
| 6,245,462 B1 | 6/2001 | Kao et al. |
| 6,267,923 B1 | 7/2001 | Albert et al. |
| 6,274,274 B1 | 8/2001 | Schaeffer et al. |
| 6,291,097 B1 | 9/2001 | Barker et al. |
| 6,291,104 B1 | 9/2001 | Yoshihora et al. |
| 6,312,852 B1 | 11/2001 | Wagner |
| 6,316,148 B1 | 11/2001 | Timmons et al. |
| 6,342,110 B1 | 1/2002 | Palumbo |
| 6,348,283 B1 | 2/2002 | Mas et al. |
| 6,351,878 B1 | 3/2002 | Rao |
| 6,367,131 B1 | 4/2002 | Omae et al. |
| RE37,804 E | 7/2002 | Mattan |
| 6,419,712 B1 | 7/2002 | Haverstick |
| 6,442,811 B1 | 9/2002 | Dawood et al. |
| 6,444,366 B1 | 9/2002 | Kawano et al. |
| 6,454,977 B1 | 9/2002 | Kwok et al. |
| 6,468,318 B1 | 10/2002 | Meadows et al. |
| 6,582,855 B1 | 6/2003 | Miyamoto et al. |
| 6,592,686 B2 | 7/2003 | Palumbo |
| 6,649,306 B2 | 11/2003 | Prengaman |
| 6,749,950 B2 | 6/2004 | Zhang |
| 6,755,874 B2 | 6/2004 | Chen et al. |
| 6,797,403 B2 | 9/2004 | Clark et al. |
| 6,833,218 B2 | 12/2004 | Mann |
| 6,893,777 B2 | 5/2005 | Probst |
| 6,921,611 B2 | 7/2005 | Schaeffer et al. |
| 6,953,641 B2 | 10/2005 | Chen |
| 7,105,252 B2 | 9/2006 | Kelley et al. |
| 7,398,581 B2 | 7/2008 | Chen |
| 7,767,347 B2 | 8/2010 | Kao et al. |
| 7,799,463 B2 | 9/2010 | Schaeffer et al. |
| 8,034,488 B2 | 10/2011 | Schaeffer et al. |
| 8,203,948 B2 | 6/2012 | Kiss et al. |
| 8,399,134 B2 | 3/2013 | Kelley et al. |
| 8,586,248 B2 | 11/2013 | Mack et al. |
| 8,617,747 B2 | 12/2013 | Kelley et al. |
| 8,846,252 B2 | 9/2014 | Wetzel et al. |
| 8,883,353 B2 | 11/2014 | Streuer |
| 8,980,419 B2 | 3/2015 | Kao et al. |
| 8,993,151 B2 | 3/2015 | Mack |
| 9,299,980 B2 | 3/2016 | Volberding et al. |
| 9,368,800 B2 | 6/2016 | Harker et al. |
| 9,379,378 B2 | 6/2016 | Ross et al. |
| 9,577,266 B2 | 2/2017 | Troxel et al. |
| 9,761,883 B2 | 9/2017 | Taylor et al. |
| 2002/0015891 A1 | 2/2002 | Schaeffer et al. |
| 2002/0088515 A1 | 7/2002 | Aust et al. |
| 2002/0182478 A1 | 12/2002 | Wirtz |
| 2002/0182487 A1 | 12/2002 | Wirtz |
| 2003/0059674 A1 | 3/2003 | Mann et al. |
| 2003/0096170 A1 | 5/2003 | Fujiwara et al. |
| 2004/0033157 A1 | 2/2004 | Schaeffer |
| 2004/0038129 A1 | 2/2004 | Mann |
| 2004/0142243 A1 | 7/2004 | Furukawa et al. |
| 2004/0187986 A1 | 9/2004 | Schaeffer |
| 2005/0037264 A1 * | 2/2005 | Nakamura ........... H01M 4/685 |
| | | 429/241 |
| 2005/0112470 A1 | 5/2005 | Taylor et al. |
| 2005/0150092 A1 | 7/2005 | Chen |
| 2005/0164091 A1 | 7/2005 | Schaeffer et al. |
| 2005/0238952 A1 | 10/2005 | Prengaman |
| 2006/0096079 A1 | 5/2006 | Farina |
| 2006/0121353 A1 | 6/2006 | Jang |
| 2006/0213055 A1 | 9/2006 | Fujiwara |
| 2007/0111089 A1 | 5/2007 | Swan |
| 2007/0148542 A1 | 6/2007 | Szymborski et al. |
| 2008/0289161 A1 | 11/2008 | Chen |
| 2009/0258299 A1 | 10/2009 | Kao et al. |
| 2009/0291359 A1 | 11/2009 | Wirtz et al. |
| 2010/0266903 A1 | 10/2010 | Kao et al. |
| 2010/0304219 A1 | 12/2010 | Schaeffer |
| 2011/0311876 A1 | 12/2011 | Sturgeon et al. |
| 2012/0047719 A1 | 3/2012 | Schaeffer |
| 2012/0058394 A1 | 3/2012 | Schaeffer |
| 2013/0029203 A1 | 1/2013 | Ross et al. |
| 2013/0115509 A1 | 5/2013 | Taylor et al. |
| 2013/0145613 A1 | 6/2013 | Wang et al. |
| 2014/0127587 A1 * | 5/2014 | Mack ............... H01M 2/1613 |
| | | 429/241 |
| 2014/0212764 A1 | 7/2014 | Fujita et al. |
| 2014/0356727 A1 | 12/2014 | Nouzuka et al. |
| 2015/0104715 A1 | 4/2015 | Dudenbostel et al. |
| 2016/0181595 A1 | 6/2016 | Reich |
| 2016/0254548 A1 * | 9/2016 | Staffeldt ............... H01M 4/74 |
| | | 429/241 |
| 2016/0260982 A1 | 9/2016 | Koch |

FOREIGN PATENT DOCUMENTS

| | | |
|---|---|---|
| CN | 1515043 A | 7/2004 |
| CN | 1751255 | 3/2006 |
| CN | 1833896 A | 9/2006 |
| CN | 101182620 | 5/2008 |
| CN | 101233635 A | 7/2008 |
| CN | 201514971 U | 6/2010 |
| CN | 201590450 U | 9/2010 |
| CN | 201741750 U | 2/2011 |
| CN | 201766122 U | 3/2011 |
| CN | 202094214 U | 12/2011 |
| CN | 202308163 U | 7/2012 |
| CN | 102884661 A | 1/2013 |
| CN | 103190023 A | 7/2013 |
| CN | 105671362 A | 6/2016 |
| CN | 105745775 A | 7/2016 |
| DE | 1007835 B | 5/1957 |
| DE | 2528688 | 1/1977 |
| DE | 8013625 U1 | 11/1980 |
| DE | 3045683 | 6/1982 |
| DE | 3234342 A1 | 3/1984 |
| DE | 102008029386 A1 | 12/2009 |
| EP | 0029788 | 11/1980 |
| EP | 0065996 | 5/1981 |
| EP | 0348702 | 1/1990 |
| EP | 0589549 | 3/1994 |
| EP | 0795917 A2 | 9/1997 |

(56) References Cited

FOREIGN PATENT DOCUMENTS

| | | |
|---|---|---|
| EP | 0969108 | 1/2000 |
| EP | 1041164 | 10/2000 |
| EP | 33465 A1 | 8/2002 |
| EP | 1270754 | 2/2003 |
| EP | 2774199 B1 | 9/2014 |
| GB | 570953 | 7/1945 |
| GB | 724056 A | 2/1955 |
| GB | 1377039 | 5/1973 |
| GB | 1 376 162 A | 12/1974 |
| GB | 2127614 A | 7/1983 |
| GB | 2170343 | 7/1986 |
| JP | S39-11225 | 4/1928 |
| JP | 56-110578 | 1/1955 |
| JP | 58-155660 | 9/1958 |
| JP | 50028638 | 3/1975 |
| JP | 55046267 | 3/1980 |
| JP | 55130076 | 10/1980 |
| JP | 55144659 | 11/1980 |
| JP | 56032678 | 4/1981 |
| JP | 56107474 | 8/1981 |
| JP | 56138871 | 10/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |
| JP | 58075772 | 5/1983 |
| JP | S58117644 A | 7/1983 |
| JP | 59134563 | 8/1984 |
| JP | 60000062 | 1/1985 |
| JP | 60009061 | 1/1985 |
| JP | 60037663 | 2/1985 |
| JP | 60039766 | 3/1985 |
| JP | 60-78570 | 5/1985 |
| JP | 60143570 | 7/1985 |
| JP | 60150556 | 8/1985 |
| JP | 60167267 | 8/1985 |
| JP | 60167268 | 8/1985 |
| JP | 60198055 | 10/1985 |
| JP | 61124052 | 6/1986 |
| JP | S62147653 | 7/1987 |
| JP | 63213264 | 9/1988 |
| JP | 1030168 | 2/1989 |
| JP | 2297864 | 12/1990 |
| JP | 3030260 | 2/1991 |
| JP | 3245462 | 11/1991 |
| JP | H04-196060 A | 7/1992 |
| JP | 5036416 | 2/1993 |
| JP | H0554893 A | 3/1993 |
| JP | 5275081 | 10/1993 |
| JP | 07065822 | 3/1995 |
| JP | 08-17438 | 1/1996 |
| JP | 8083617 | 3/1996 |
| JP | 08-213023 | 8/1996 |
| JP | H08213023 A | 8/1996 |
| JP | 8287905 | 11/1996 |
| JP | 09-231995 | 9/1997 |
| JP | 10284085 | 10/1998 |
| JP | 11054115 | 2/1999 |
| JP | 11213993 | 8/1999 |
| JP | H11512975 | 11/1999 |
| JP | 2000-164223 | 6/2000 |
| JP | 2000-340235 | 12/2000 |
| JP | 2001126735 A | 5/2001 |
| JP | 2001229920 | 8/2001 |
| JP | 2001-524736 | 12/2001 |
| JP | 2002-260716 | 9/2002 |
| JP | 2003-36852 | 2/2003 |
| JP | 2003178760 A | 6/2003 |
| JP | 2004-165149 | 6/2004 |
| JP | 2004-199951 | 7/2004 |
| JP | 2004-521445 | 7/2004 |
| JP | 2004196060 A | 7/2004 |
| JP | 2004-253324 | 9/2004 |
| JP | 2008542997 A | 11/2008 |
| KR | 10-2016-0001233 A | 4/2016 |
| WO | 9004267 A1 | 4/1990 |
| WO | WO 199927595 | 6/1999 |
| WO | WO 0104978 A1 | 1/2001 |
| WO | WO 2001004977 | 1/2001 |
| WO | WO 200153549 | 7/2001 |
| WO | 0215296 A2 | 2/2002 |
| WO | WO 200215296 | 2/2002 |
| WO | WO 2002054513 A2 | 7/2002 |
| WO | 03038933 A2 | 5/2003 |
| WO | WO 2006127575 | 11/2006 |
| WO | WO 2008/109429 A2 | 9/2008 |
| WO | WO 2009/150485 A1 | 12/2009 |
| WO | 2011090946 A1 | 7/2011 |
| WO | 2011/109493 A1 | 9/2011 |
| WO | WO 2011/130514 A1 | 10/2011 |

OTHER PUBLICATIONS

PCT Search Report dated Oct. 6, 1999 in PCT/US99/13291.
International Search Report and Written Opinion dated Oct. 5, 2006 for International Application No. PCT/US06/019686, 2 pages.
Response dated May 28, 2009 to Office Action for EPO Application No. 067707804.0-2119. 9 pages.
Office Action dated Jan. 21, 2009 for EPO Application No. 06770804.0-2119, 3 pages.
Office Action dated Apr. 23, 2008 for EPO Application No. 06770804.0-2119, 5 pages.
Response dated Oct. 28, 2008 to Office Action for EPO Application No. 06770804.0-2119, 5 pages.
Chinese Patent Office, Office Action (with English Translation) dated Jul. 6, 2009 for Chinese Patent Application No. 200680017715.1 based on PCT/US06/019686, 12 pages.
Office Action dated Sep. 30, 2009 from U.S. Appl. No. 11/984,666.
Amendment and Response dated Dec. 30, 2009 from U.S. Appl. No. 11/984,666.
Office Action dated Jan. 19, 2010 from Brazil Patent Application No. PI 0206343-3 (with English Translation).
S. Goodman "Plates with improved conductivity" Batteries International, pp. 88-89 (no month).
Non-Final Office Action dated Nov. 19, 2003 from U.S. Appl. No. 09/755,337.
PCT International Search Report for PCT/US98/24345 (International Filling Date Mar. 3, 1999); date of mailing Mar. 11, 1999; 2 pp.
Reply and Amendment dated Feb. 12, 2004 from U.S. Appl. No. 09/755,337.
Final Office Action dated May 19, 2004 from U.S. Appl. No. 09/755,337.
Reply and Amendment dated Jul. 19, 2004 from U.S. Appl. No. 09/755,337.
Office Action dated Jan. 7, 2003 for U.S. Appl. No. 09/755,337.
Office Action dated Jun. 18, 2003 for U.S. Appl. No. 09/765,337.
Office Action dated Sep. 16, 2002 for U.S. Appl. No. 09/755,337 .
U.S. Appl. No. 09/755,337 titled "Method for Making an Alloy Coated Battery Grid" by Yu-Lin Chen.
Patent Abstract for AU 275685.
International Search Report dated Oct. 12, 2000 for PCT/US00/18313.
PCT Search Report dated Oct. 9, 2000 for PCT/US00/18144.
International Search Report dated Aug. 19, 2002 for PCT/US02/00390, 7 pages.
Office Action dated May 1, 2003 for U.S. Appl. No. 09/898,660 .
Office Action dated Mar. 24, 2003 for U.S. Appl. No. 09/898,660.
U.S. Appl. No. 09/898,660 titled "Modifiction of the Shape/Surface Finish of Battery Grid Wires to Improve Paste Adhesion" by Schaeffer et al., filed Jul. 2, 2001.
Ishikawa et al., "A punched grid production process for automotive batteries" from Pb 80, 7th International Conference (1980).
Perez, "The Complete Battery Book" TAB Books, Inc., 191 p., 1985 (no month).
PCT Search Report Aug. 11, 2000 for PCT/US00/12569.

(56) References Cited

OTHER PUBLICATIONS

Office Action dated Aug. 5, 2009 (with English translation) for Chinese Patent Appln. No. 20060017715.1.
Response dated Sep. 23, 2009 for Chinese Patent Appln. No. 20060017715.1.
Traditional Lead Acid Battery Shortcomings, www.fireflyenergy.com.
Megger, Failure Modes—Lead-acid (flooded) failure modes, Battery Testing Guide, p. 7.
Written Opinion of the International Searching Authority, International Application No. PCT/US2011/026836.
International Search Report, International Application No. PCT/US2011/026836.
International Search Report and Written Opinion of the International Searching Authority dated Jul. 24, 2013 for PCT/US2012/062698 filed Oct. 31, 2012.
Yue, Sun et al., "Metal Corrosion and Control," Harbin Institute of Technology Press, Apr. 30, 2003, pp. 181 and 204-205.
International Preliminary Report on Patentability and Written Opinion of the International Searching Authority dated May 5, 2016 for PCT/EP2014/072556, 15 pgs (English transl.).

* cited by examiner

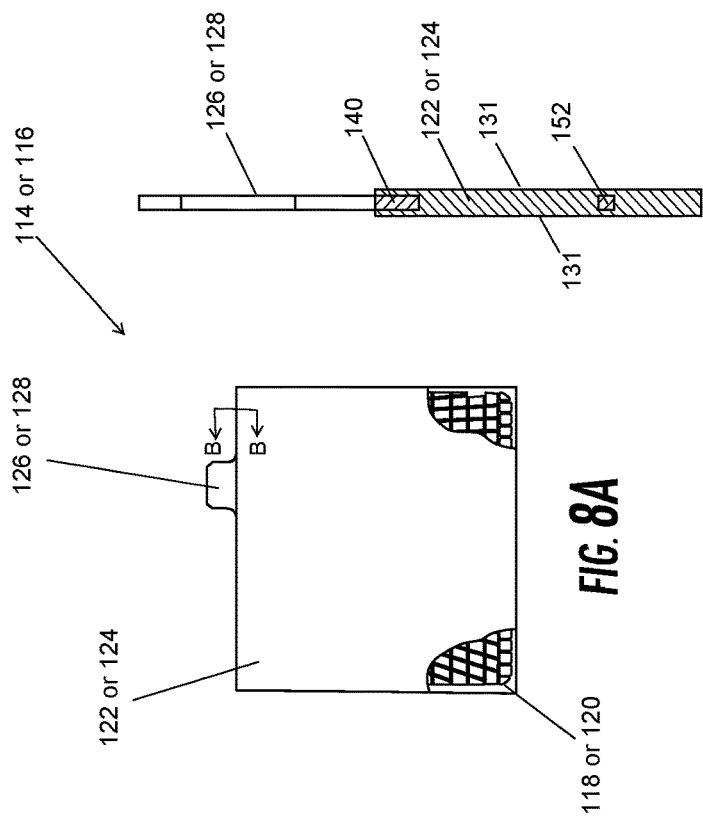
FIG. 8A
FIG. 8B
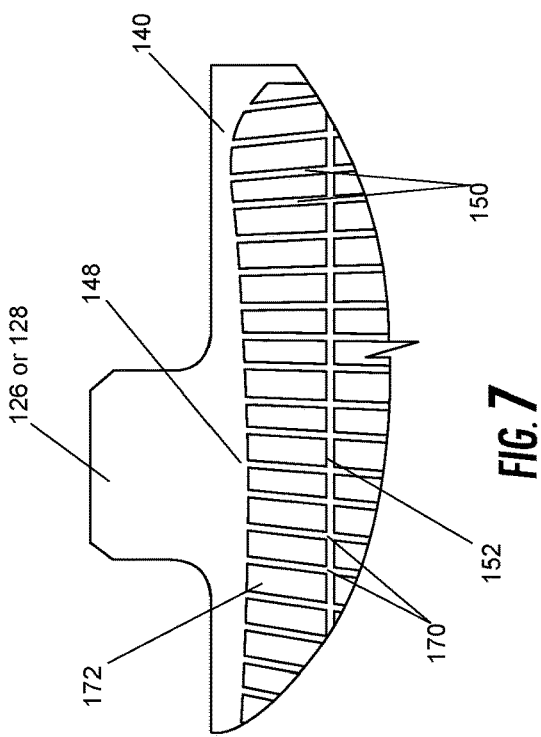
FIG. 7

BATTERY GRID

CROSS-REFERENCE TO RELATED APPLICATIONS

This application is a National Stage Entry of PCT/US18/15426 filed Jan. 26, 2018, which claims priority to U.S. Provisional Patent Application, Ser. No. 62/451,590, filed Jan. 27, 2017, entitled BATTERY GRID; this application also claims priority to U.S. Provisional Patent Application, Ser. No. 62/488,388, filed Apr. 21, 2017, entitled BATTERY GRID, the entire contents of each of which are hereby incorporated by reference herein in their entirety.

FIELD

The present inventions relate to the field of batteries (e.g., lead acid batteries including batteries for vehicle starting, lighting and ignition applications; marine batteries; commercial batteries; industrial batteries; batteries for use with hybrid-electric vehicles, micro-hybrid vehicles, etc.). The present inventions more specifically relate to battery grids and methods of making battery grids.

BACKGROUND

Lead acid batteries are known. Lead acid batteries are made up of plates of lead and separate plates of lead dioxide, which are submerged into an electrolyte solution. The lead, lead dioxide and electrolyte cause a chemical reaction that releases electrons, allowing them to flow through conductors to produce electricity.

One type of lead acid battery is an AGM or Absorbent Glass Mat lead acid battery which is a sealed (e.g., non-maintenance) battery in which the electrolyte is absorbed and retained in a mat that is wrapped around a current collector or grid. Known current AGM batteries use a rectilinear grid pattern lead-alloy grid. Some of these grids may be spiral wound. These grids and corresponding batteries have various drawbacks.

SUMMARY

Accordingly, an improved grid for a lead acid battery is disclosed. In one or more examples of embodiments, the grid is for use in an AGM lead acid battery. The grid has opposed top and bottom frame elements, opposed first and second side frame elements, and a plurality of radial grid wires, wherein the grid may be comprised almost entirely of lead. In various embodiments, the grid may be comprised almost entirely of virgin lead or high purity lead or highly purified secondary lead.

An absorbent glass mat lead acid battery is also disclosed. The battery includes a housing having a plurality of electrochemical cells. The electrochemical cells are formed by a plurality of positive plates each comprising a positive grid and a positive paste thereon, a plurality of negative plates each comprising a negative grid and a negative paste thereon, an absorbent glass mat interleaved between each positive plate and each negative plate, and an electrolyte retained by the absorbent glass mat. The positive grid and negative grid each comprise a frame formed of a top frame element having a current collection lug, a first side frame element, a second side frame element, a bottom frame element, and a plurality of grid wires arranged in radial configuration within the frame which radial configuration emanates from a radiant point located outside a boundary of the frame. A plurality of horizontal grid wires cross the plurality of grid wires arranged the radial configuration. The positive grid and negative grid each comprise virgin lead or high purity lead or highly purified secondary lead.

A grid for an absorbent glass mat lead acid battery is also disclosed. The grid has a frame formed of a top frame element having a current collection lug, a first side frame element, a second side frame element, and a bottom frame element. A plurality of grid wires are arranged in radial configuration within the frame which radial configuration emanates from a radiant point located outside a boundary of the frame. A plurality of horizontal grid wires cross the plurality of grid wires arranged the radial configuration. The grid comprises virgin lead or high purity lead or highly purified secondary lead.

A punched battery grid is also disclosed. The grid comprises virgin lead or high purity lead or highly purified secondary lead and has a plurality of grid wires in a pattern arranged within a full frame. The pattern is a pattern of grid wires which emanates from a radiant point, wherein the radiant point is located outside the boundary of the frame.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 7 is a sectional view of the grid shown in FIG. 6, taken from section 7-7 of FIG. 6.

FIG. 8A is a cut-away elevation view of a plate including a battery grid with paste and pasting material thereon according to one or more examples of embodiments.

FIG. 8B is a sectional view of the plate shown in FIG. 8A, taken from section B of FIG. 8A.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
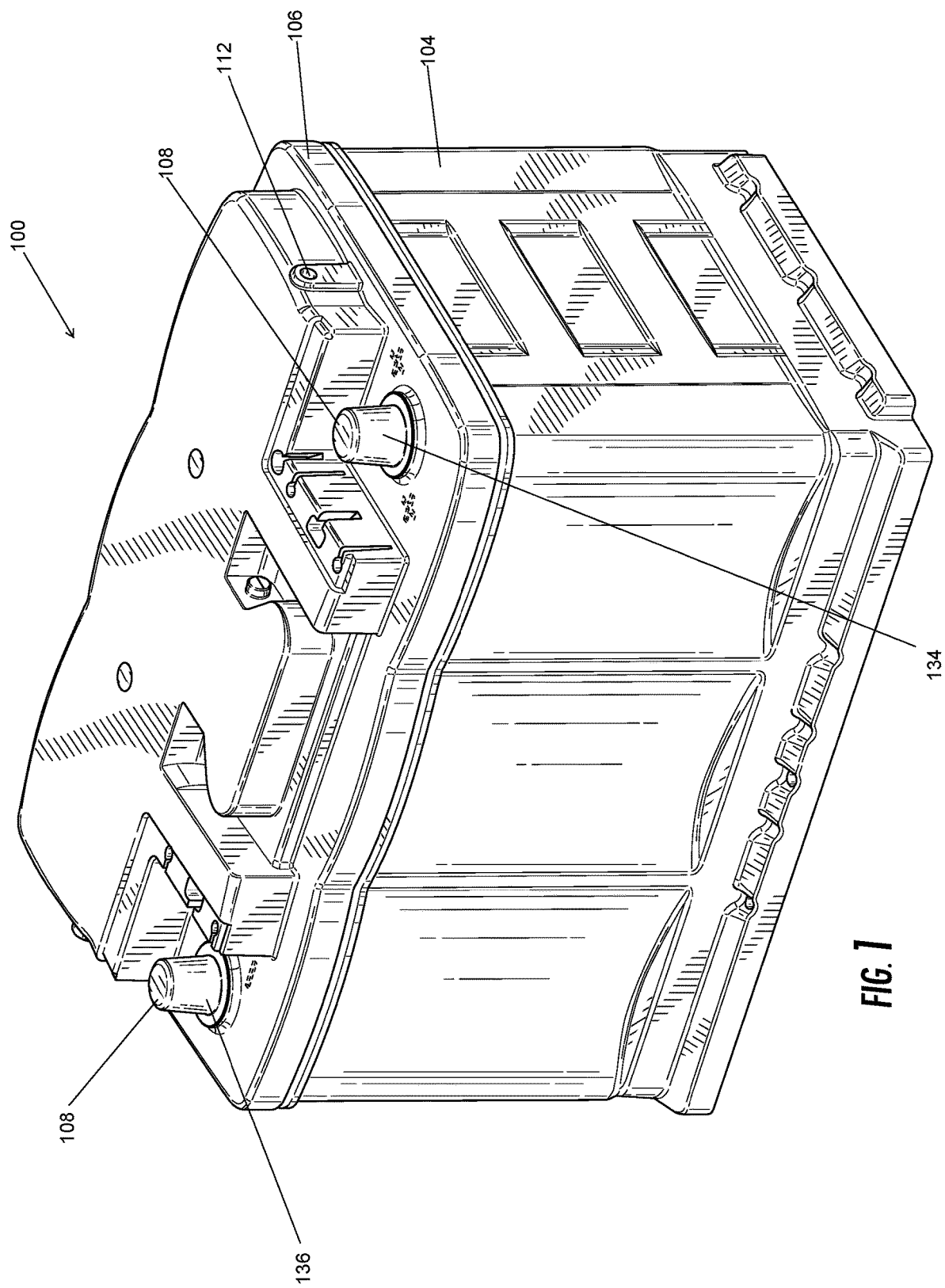
FIG. 1 is a perspective view of an example lead acid battery including a battery grid according to one or more examples of embodiments.

Referring to FIG. 1 a battery 100 is disclosed, and in particular a rechargeable battery, such as, for example, a lead acid battery. According to one or more examples of embodiments, the battery 100 is a lead acid storage battery. Various embodiments of lead acid storage batteries may be either sealed (e.g., non-maintenance) or unsealed (e.g., wet). According to one or more examples of embodiments, the lead acid storage battery 100 is preferably a sealed lead acid battery or AGM lead acid battery and, to this end, may include an absorbent glass mat (AGM). While specific examples are described and illustrated, the battery 100 may be any secondary battery suitable for the purposes provided.

Figure 2:
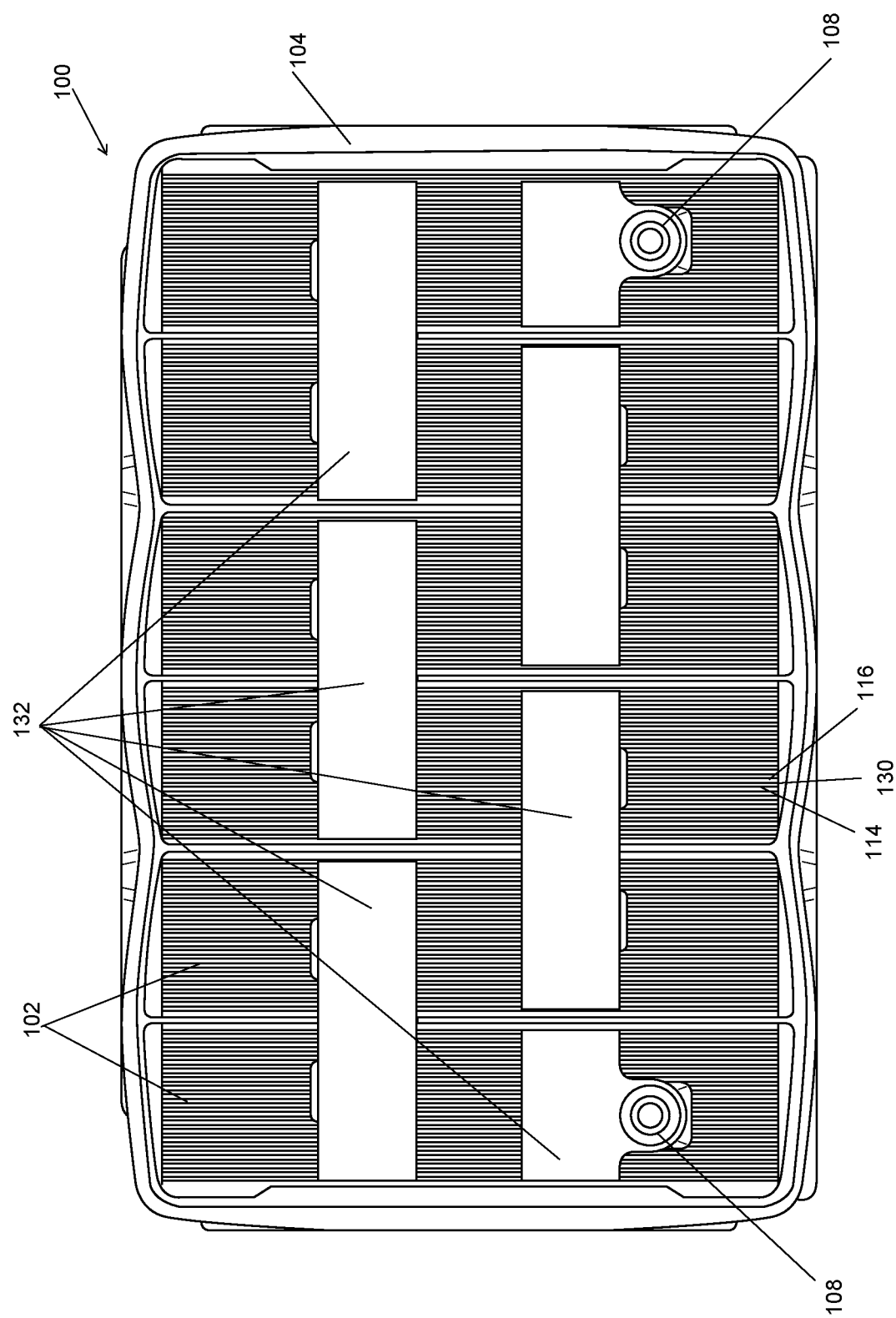
FIG. 2 is a top plan view of the lead acid battery including a battery grid shown in FIG. 1, with the battery cover removed.

Referring to FIGS. 1-2, the lead acid storage battery 100 includes several cell elements or electrochemical cells 102 which are provided in separate compartments of a container or housing 104 containing electrolyte. A cover 106 or lid is provided for the housing 104 (see FIG. 1), and in various embodiments, the cover 106 includes battery terminals 108 (e.g., positive terminal 134 and negative terminal 136). In one or more preferred examples of embodiments, the cover 106 is sealed to the housing 104. The battery housing 104 or cover 106 may also include one or more filler hole caps 110 (FIG. 4) and/or vent assemblies 112 (FIG. 1).

Figure 3:
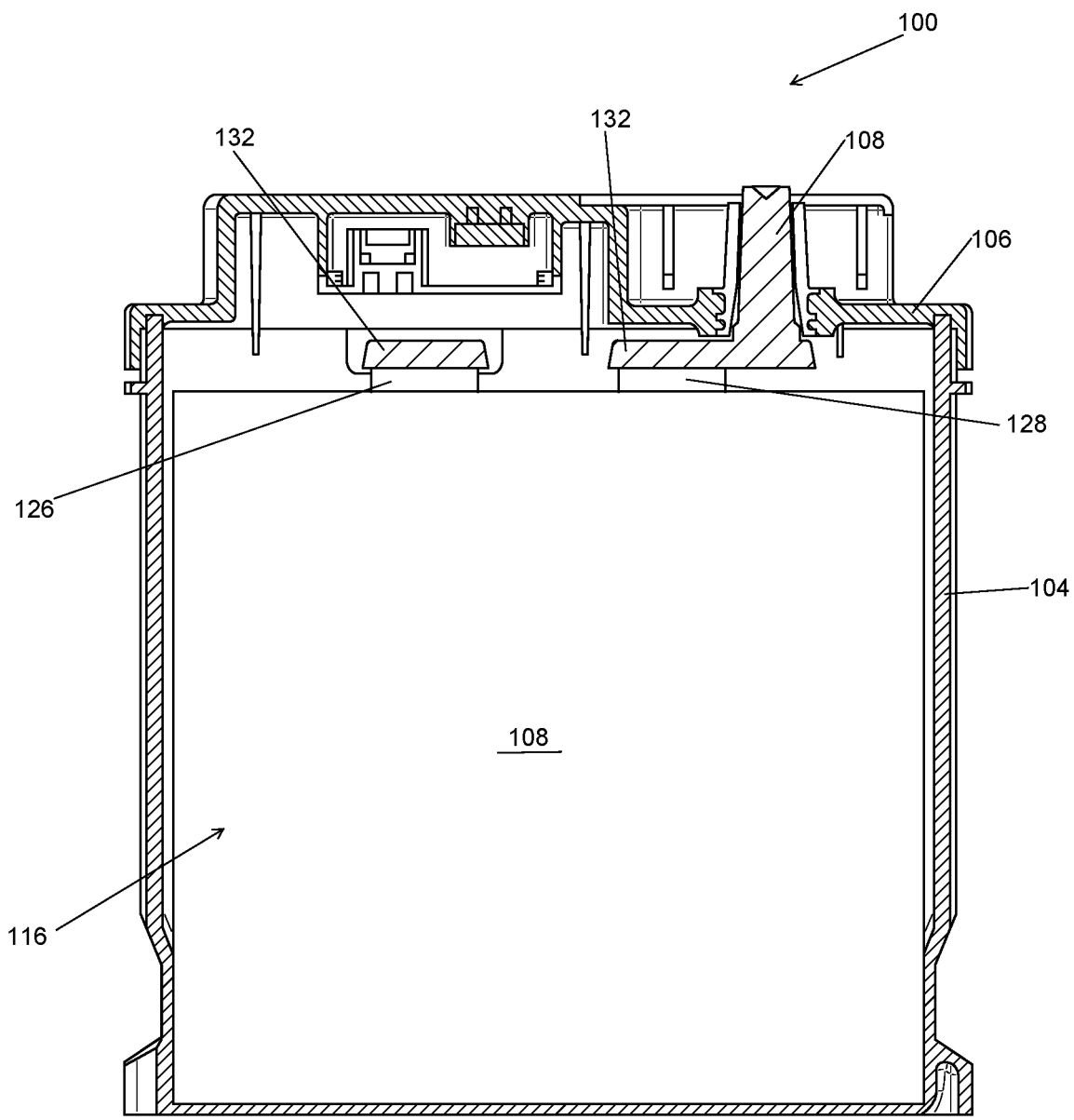
FIG. 3 is a cross-sectional elevation view of the lead acid battery including a battery grid shown in FIG. 1, showing the grid with an absorbent glass mat.
Figure 4:
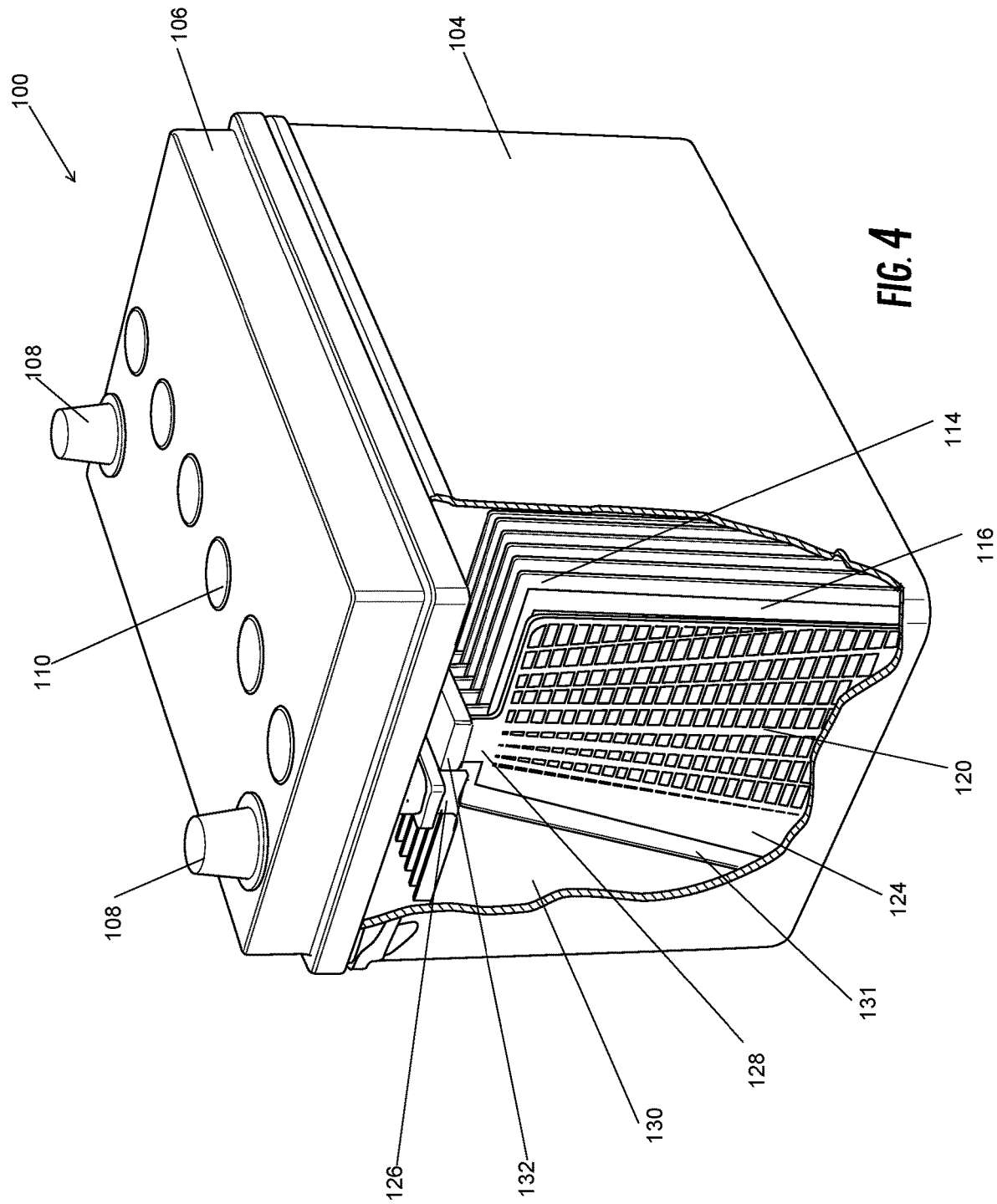
FIG. 4 is a cut-away perspective view of an additional example lead acid battery including a battery grid according to one or more examples of embodiments, showing a grid and absorbent glass mat.
Figure 5:
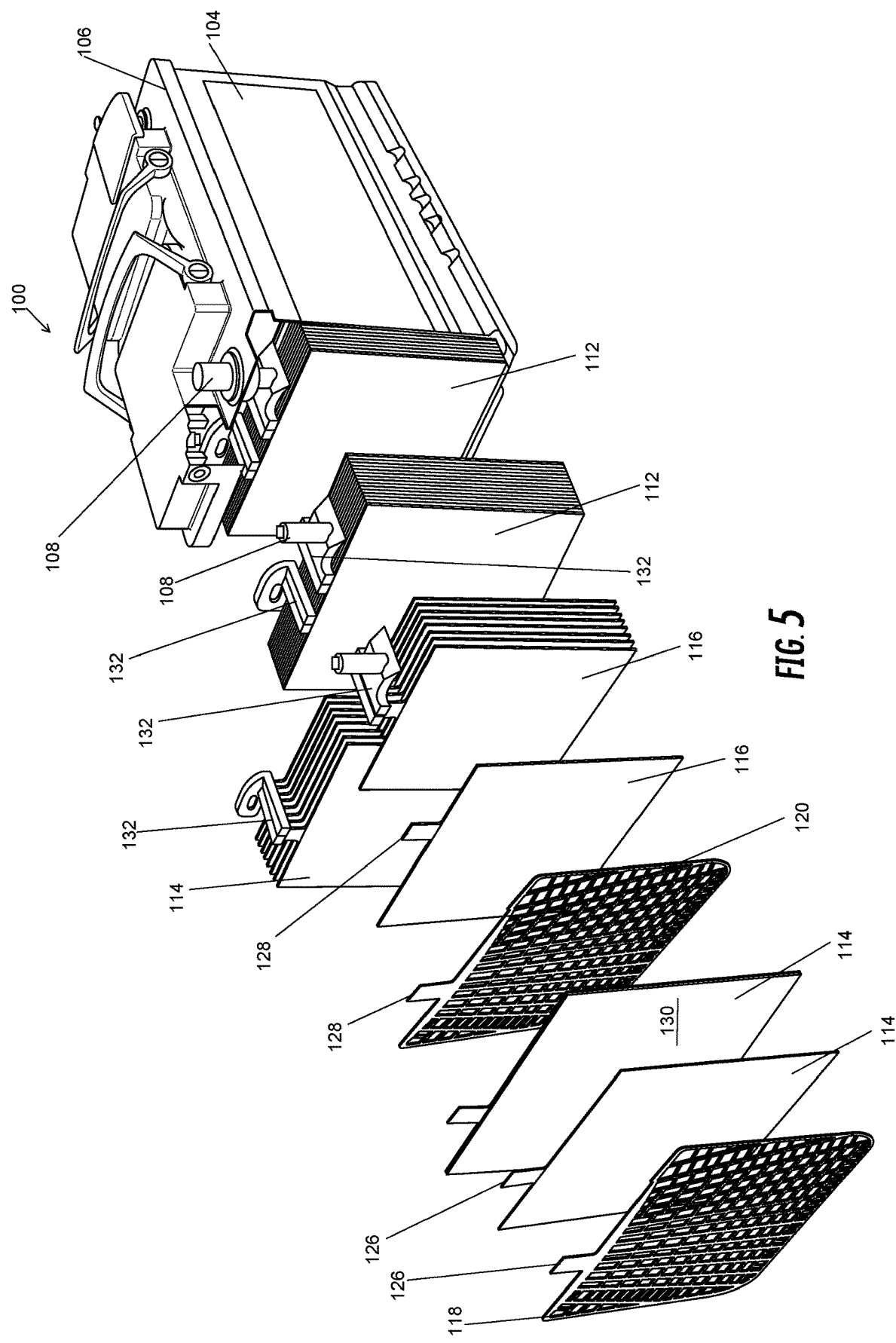
FIG. 5 is a partially exploded perspective view of an additional example of a lead acid battery including a battery grid according to one or more examples of embodiments.
Figure 6:
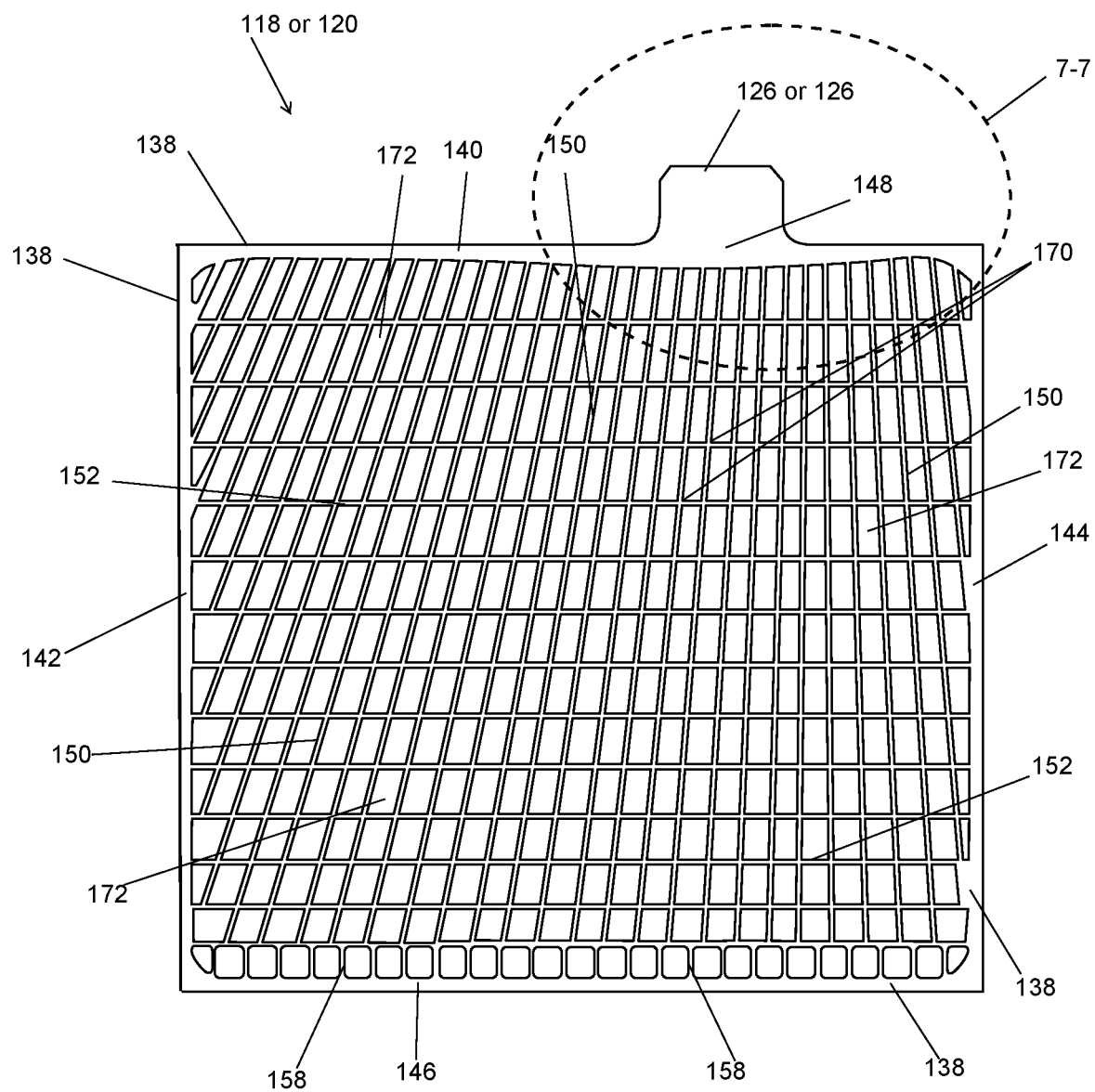
FIG. 6 is an elevation view of a grid according to one or more examples of embodiments for use with a lead acid battery.

The illustration provided herein for purposes of example relates to automotive applications, wherein groups of 8-20 electrode plates 114, 116 are used in each of six stacks or plate sets or blocks 112, both positive and negative, forming electrochemical cells 102 in an automotive 12-volt battery. It should be understood the disclosed grid, discussed in further detail herein below, may be used in applications wherein, as a non-limiting example, anywhere from 6 to 31 plates 114, 116 may be used in a stack 112. The number of stacks or plate sets 112 may be varied as well. It will be obvious to those skilled in the art after reading this specification that the size and number of plates 114, 116 in any particular stack (including the size and number of the individual grids), and the number of stacks 112 used to construct the battery 100 may vary widely depending upon the desired end use. Each electrochemical cell 102 may include one or more positive plates 114 and one or more negative plates 116, and preferably includes a plurality of positive plates 114 and a plurality of negative plates 116. Each plate is 114, 116 formed of a grid 118, 120 pasted with an active material 122, 124 (see FIGS. 8A-8B). Each grid 118, 120 has a lug 126, 128 (see, e.g., FIGS. 3, 5, 7). Referring to FIGS. 3-5, separator material 130 may be provided between each positive plate 114 and negative plate 116. The separator 130 may be an absorbent glass mat (AGM), and in one or more examples of embodiments may be wrapped around a portion of or interleaved with/between one (or both) of the positive and negative plates 114, 116. Accordingly, the battery or electrochemical cell includes a plurality of positive plates each comprising a positive grid and a positive paste thereon, a plurality of negative plates each comprising a negative grid and a negative paste thereon, an absorbent glass mat interleaved between each positive plate and each negative plate, and an electrolyte retained by the absorbent glass mat and/or otherwise provided in the battery container.

The plurality of electrochemical cells 102 may be electrically connected, e.g., electrically coupled in series or another configuration according to the capacity of the lead storage battery 100 (see FIGS. 2-4). One or more cast on straps or intercell connectors 132 are provided which electrically couple the lugs 126, 128 in a plate set 112 and other respective plate sets in the battery 100. One or more positive and one or more negative terminals 134, 136 may also be provided. Such terminals 134, 136 typically include portions which may extend through the cover 106 and/or housing 104, depending upon the battery design. It will be recognized that a variety of terminal arrangements are possible, including top, side or corner configurations known in the art.

As indicated, the battery 100 includes a positive plate 114 and a negative plate 116 and each plate includes a grid 118, 120 that supports an electrochemically active material 122, 124. In the illustrated examples of embodiments, the positive and negative plates 114, 116 are paste-type electrodes or plates (see FIGS. 5 & 8A-8B). The paste-type electrode includes the grid 118, 120 as further described herein below which forms a substrate and the electrochemically active material or paste 122, 124 provided on the substrate. The grids, including a positive grid 118 and a negative grid 120, provide an electrical contact between the positive and negative active materials 122, 124 or paste which may serve to conduct current.

Referring to FIGS. 6-7 and 9-10, a positive grid 118 will be specifically described for purposes of example, but the description may equally apply to a negative grid 120. The grid includes a frame 138. As indicated, the grid may be fully framed. To this end, the frame 138 has a top frame element 140, first and second side frame elements 142, 144, and a bottom frame element 146. A current collection lug 126 (or 128) may be integral with the top frame element 140. The lug 126 (or 128) may be offset from the center of the top frame element 140, or alternatively may be centered or positioned closer to either the first or second side frame elements 142, 144. The lug 126 (or 128) may also be provided in a consistent width. Accordingly, the battery grid frame 138 has a top, a first side, a second side, and a bottom, wherein the top has a lug. The top frame element 140 may also include an enlarged conductive section 148, at least a portion of which is directly beneath the lug, which may optimize current conduction to the lug 126 (or 128).

The battery grid 118 also includes grid wires 150, 152. The grid wires 150, 152 may be provided in a grid network formed by a plurality of grid wires arranged in a pattern within the frame 138. The grid network may include one or more grid wires 150 joined to the top frame element 140. The grid network may include one or more grid wires 150 joined to the first side frame element 142. The grid network may include one or more grid wires 150 joined to the second side frame element 144. The grid network may include one or more grid wires 150 joined to the bottom frame element 146. The grid network may also include combinations of the foregoing, such as for example but not limited to, one or more grid wires 150 joined to the top frame element 140 and a side frame element 142 or 144 or the bottom frame element 146, or joined to two side frame elements.

One or more of the grid wires 150 may increase in cross-sectional area along their length from bottom to top, or alternatively in one or more examples of embodiments, may have a tapered shape.

The grid pattern of the battery grid may comprise one or more grid wires 150 arranged in a radial configuration. That is, as can be seen in the example illustrated in FIGS. 6, 9-10, the pattern of grid wires includes radially extending grid wires 150. Specifically, the grid wires 150 within the frame which extend from the top frame element 140 are provided in a radial configuration. That is, a plurality of radially extending grid wires 150 extend from the top frame element 140 downward. The pattern of grid wires may emanate from a radiant point 154 (see FIG. 9) or more than one radiant point. In one example, the radiant point 154 (or plurality of radiant points) is located outside the boundary of the frame 138, and preferably located above the top frame element 140. The radially extending wires 150 extend at various angles. For example, the radially extending grid wires 150 may extend within a range of angles "α" from approximately 0.5 degrees to approximately 26.5 degrees from an imaginary line "x" perpendicular to the top frame element 140. Variations thereon suitable for the purposes provided may also be acceptable.

Figure 9:
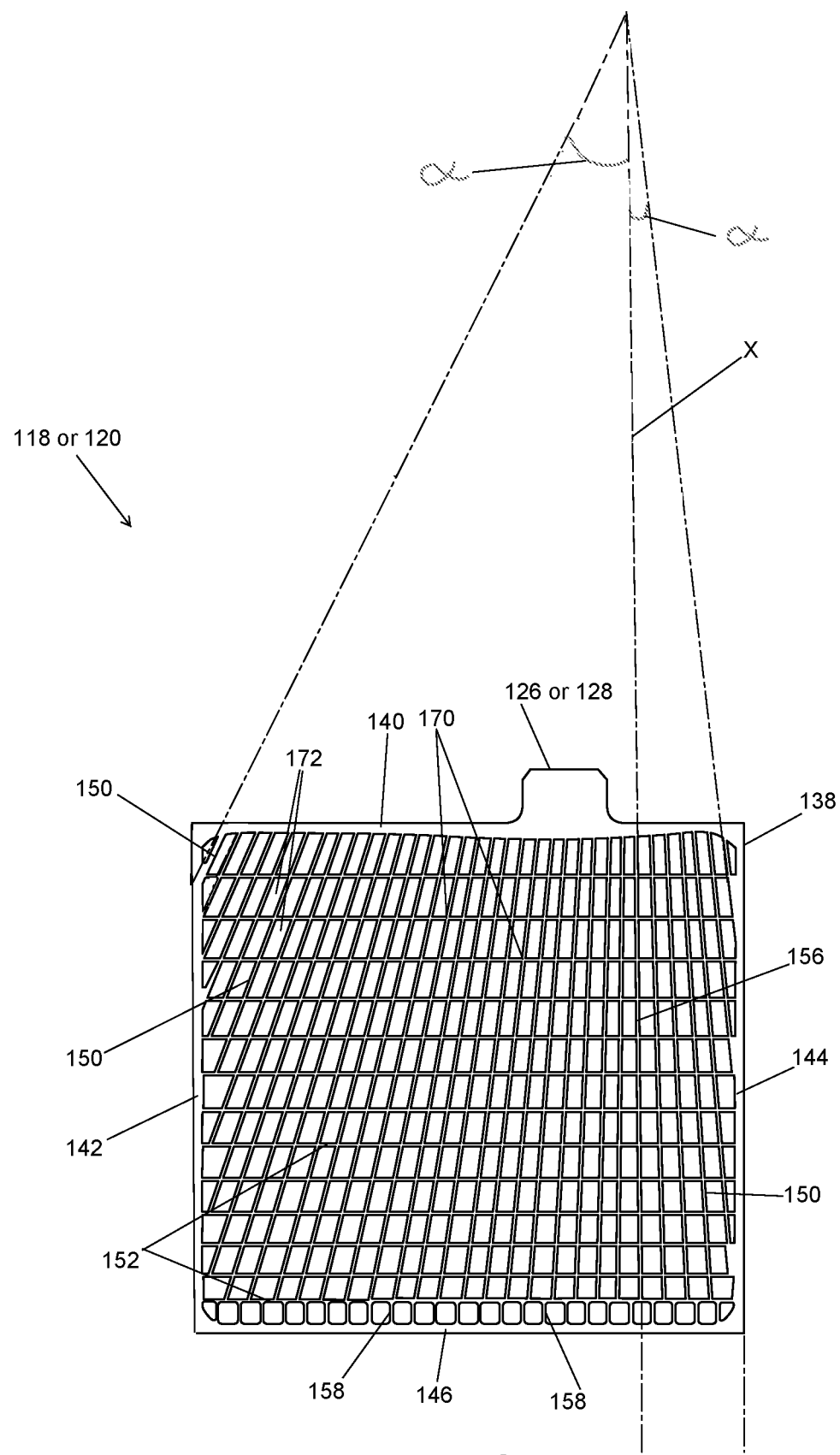
FIG. 9 is an elevation view of the battery grid shown in FIG. 6 according to one or more examples of embodiments, showing various radial grid wire angles.

In one or more examples of embodiments, one of the radially extending grid wires 156 may be provided in parallel to the side frame elements 142, 144 (see FIG. 9). The remaining radially extending grid wires 150 extend radially from an imaginary intersecting point, namely, a radiant point 154 which may be outside of the frame 138, on a radius line running through the imaginary line "x" perpendicular to the top frame element 140 or a radially extending grid wire 156 positioned parallel to the side frame elements 142, 144. In the foregoing example, the radially extending grid wires 150 become closer together when moving from a position proximate to the bottom frame element 146 toward a position proximate to the top frame element 140, and also may become spaced farther apart when moving towards the first side frame element 142 or the second side frame element 144 from the radially extending grid wire positioned parallel to the side frame elements.

One or more of the plurality of radially extending grid wires 150 may also be joined with the side frame elements 142 or 144. It is contemplated that one or more of the radially extending grid wires 150 may also be joined with the bottom frame element 146. In the illustrated example shown in FIG. 6, the radially extending grid wires 150 terminate at a grid cross wire element 152 (discussed below) prior to reaching the bottom frame element 146. Between the relevant grid cross wire element 152 and the bottom frame element 146 in the illustrated embodiments a plurality of spaced apart vertically extending grid wires 158 are provided.

In one or more examples of embodiments, the grid also includes grid cross wires 152 in the pattern of the plurality of grid wires. In the illustrated example shown in FIGS. 6, 9-10, the cross wires include, for example, horizontal grid wires 152 which extend from the first side frame element 142 to the second side frame element 144, e.g., across the grid 118. These grid wires 152 may be spaced apart (e.g., horizontally spaced apart) and may be parallel to the top and/or bottom frame elements 140, 146, although variations thereon may be acceptable for purposes provided.

Figure 10:
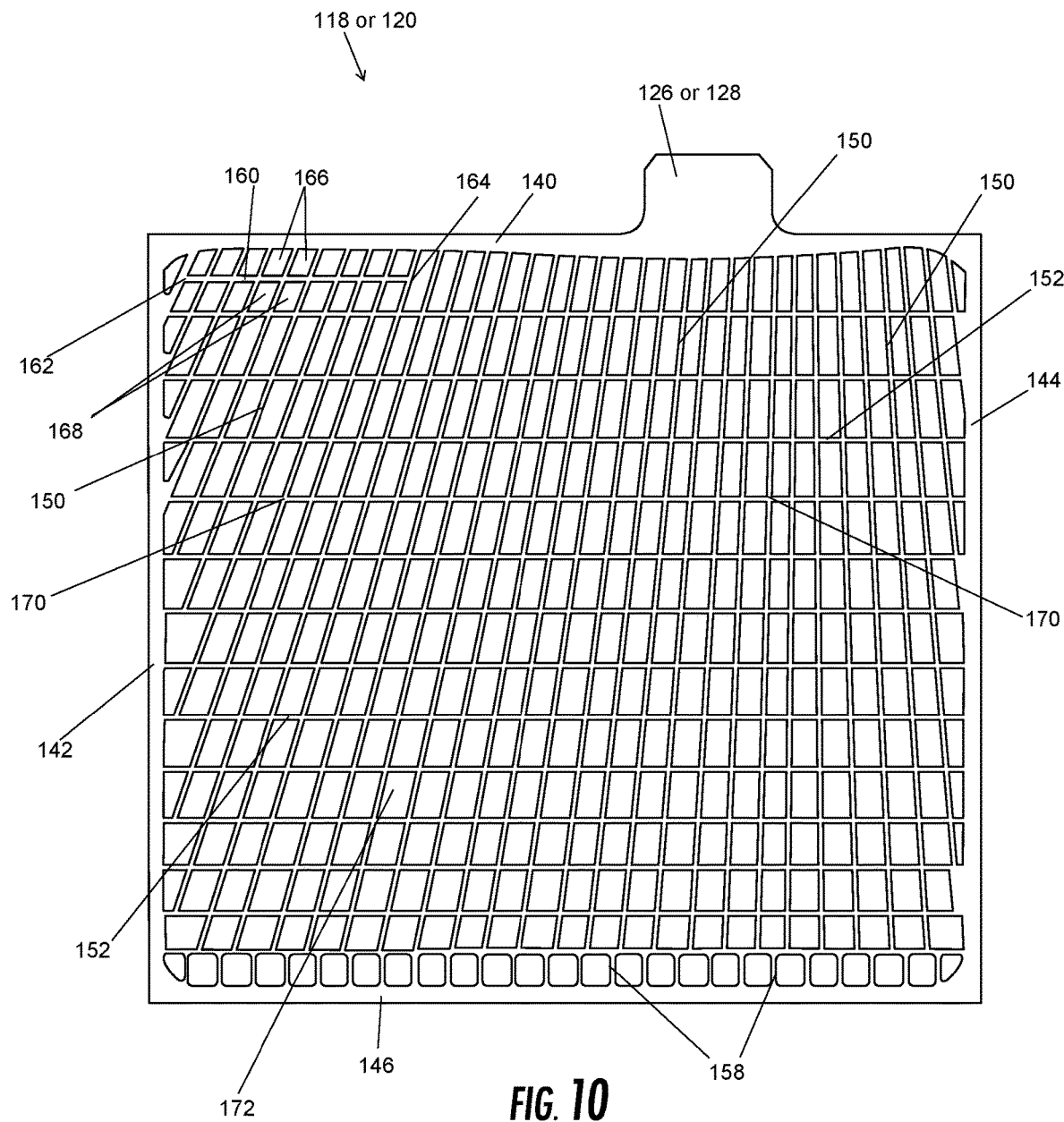
FIG. 10 is an elevation view of a battery grid according to one or more alternative examples of embodiments for use with a lead acid battery.

Referring to FIG.10, in one or more further examples of embodiments the pattern of grid wires also includes a horizontal grid wire which extends partially across the grid. In particular, a partial horizontal grid wire 160 is positioned immediately adjacent, and in FIG. 10, below the top frame element 140. The partial horizontal grid wire 160 extends from a node 162 near the side frame element 142 or 144, or from the side frame element 142 or 144, to a node 164 spaced a distance therefrom which is provided at an interior position of the grid pattern. In the illustrated embodiment, the grid wire 160 extends approximately ¼ to ⅓ of the width of the grid 118 and is positioned on the left hand side of the grid, although variations thereon may be acceptable without departing from the overall scope of the present invention. The partial horizontal grid wire 160 splits each open space 172 into two open spaces 166, 168.

The intersection or joining of a radially extending grid wire and a grid cross wire may occur at a node 170 (generally)—see also nodes 162, 164. A plurality of such intersections or coupled grid wires and grid cross wires form a plurality of nodes 170. The combination of radially extending grid wires 150, vertical grid wires 158, grid cross wires 152, 160, and/or nodes 162, 164, 170 form the one or more open spaces 172 or windows in the grid wire network carried by the frame 138. As a result, the plurality of grid wires may define a pattern including open areas or windows in the grid network and within the frame. In other words, a plurality of grid wires may be interconnected within each of the frames to create interstices. The open areas may help hold the active material or paste, which may be held in the form of "pellets".

The pattern of grid wires and corresponding shapes may optimize the current carrying capacity of the wires to help carry away increasing current being generated from the distance furthest from the lug 126, 128 to the distance closest to the lug 126, 128 on the grid 118, 120. The width and spacing of the wires, e.g., wires 150, 152, between side elements 142, 144 in one or more examples of embodiments may be predetermined so that there are substantially equal potential points across the width of the grid 118, 120. The grid wires may increase in width closer to the lug 126, 128. The number and size of grid wires may also increase in the grid from bottom to top of the grid 118, 120. Moreover, the size of the open areas 172 in the grid network may decrease in the area approaching the lug 126, 128 (that is, the open areas in the pattern may be larger further away from the lug or at the bottom of the grid versus closer to the lug or at the top of the grid). Likewise, the number of open areas 172 or windows in the grid network may increase in the area approaching the lug 126, 128 (that is, the number of open areas in the pattern may be greater closer to the lug or at the top of the grid versus further from the lug or at the bottom of the grid). In this regard, the window or opening 172 size may also differ between the top and bottom of the grid 118, 120, and as a result of the number and size of vertically extending or radial grid wires 150, the window 172 size, and the number of windows 172, more lead may be provided at or near the top of the grid. In addition, several radial grid wires 150 may extend directly below the enlarged conductive section or area 148 in the top frame element 140, which for example may provide improved conductance and efficiency of the grid.

In one non-limiting example, such as illustrated herein, the grid 118, 120 may include approximately 30 to approximately 40 radially extending grid wires 150 and approximately 10 to approximately 15 cross grid wires 152, and more preferably may include approximately 34 or 35 vertical grid wires 150 and approximately 11 or 13 cross grid wires 152.

A specific grid pattern is illustrated and described for purposes of example only. It is understood that variations thereon, such as but not limited to, grid wire thicknesses, number of grid wires, and orientation would not depart from the overall scope of the present invention.

While not required, in some embodiments, it is contemplated that the grid, including one or more of the frame elements, the grid wires and/or nodes may be reshaped or refinished or deformed or otherwise modified. For example, the cross-section may be of any cross-section design including, but not limited to, substantially oval shaped, substantially rectangular shaped, substantially diamond shaped, substantially rhomboid shaped, substantially hexagon shaped, and/or substantially octagon shaped. It is understood that these terms of shape are used loosely to identify the general cross-sectional shape and that the actual cross-section of a grid wire or node or frame element may vary from the stated shape due to, for example, the level of precision in the manufacturing process. Deformation of the grid wires may be optionally provided, for example, to improve paste adhesion.

According to one or more examples of embodiments, the grid material may be formed of virgin lead (Pb) (e.g., lead from a mine), or high purity lead, or highly purified secondary lead, or substantially pure or virgin lead, which provides various advantages over existing devices. It is understood, however, that secondary or recycled lead which accomplishes the purposes provided herein may be used. In various embodiments, the grid 118 and/or 120 may be composed of 99.9-99.99% purity lead (Pb). It is also contemplated that additional materials may be added to the grid material which accomplish the purposes provided herein.

Both the positive grid 118 and the negative grid 120 may be formed of the same material and in the same or a similar pattern. To this end, each battery grid 118, 120 may be a fully framed grid of virgin lead or high purity lead or highly purified secondary lead or substantially pure or virgin lead, including top and bottom frame elements 140, 146 and first and second side frame elements 142, 144 surrounding a grid network or pattern of the type described herein. It is contemplated, however, that the pattern may also vary between the positive grid 118 and negative grid 120.

The thickness of each grid 118, 120 may be varied based upon desired manufacturing and performance parameters. For instance, thickness may be determined based upon minimum manufacturing requirements or minimum requirements for paste adhesion, or other suitable parameters. The grid in one or more examples of embodiments is punched to form the pattern described herein. Punching processes may impart a unique structure to the grid which is the result of the process. While a punched grid or punching process is specifically described, it is understood by one of skill in the art that a variety of grid forming methods exist and it is contemplated that any one or more of such methods may be adapted to form a grid accomplishing the objectives provided herein. According to one or more examples, the grid material may comprise a minimal thickness. Advantageously, the grid 118, 120 according to one or more specific examples described herein may be reduced in thickness as compared to a commercially available punched battery grid. Likewise, the weight of the grid, and ultimately the weight of the resulting battery may also be varied. For example, by reducing the amount of lead in the grid 118, 120, the overall weight of the grid, and thus the battery including one or more such grids is reduced. In one example of embodiments, the positive and negative grids 118, 120 may be formed of different thickness. However, it is contemplated that the grids 118, 120 may be of the same thickness. As a non-limiting example, the grids 118, 120 may range from approximately 0.5 millimeters to 1.0 millimeters in thickness. In another example, the positive grid 118 may be approximately 0.8 mm thick, while the negative grid 120 may be approximately 0.7 mm thick. The grid 118, 120 itself may vary in thickness (e.g., side fame versus grid wire thickness). For example, in another example of embodiments, the side frame 142 and/or 144 width may range from approximately 2 mm to approximately 6 mm. In one or more examples of embodiments, the grid 118, 120 may be provided with a height ranging from approximately 130 mm to approximately 140 mm, and a width ranging from approximately 140 mm to approximately 150 mm. While specific examples are provided for purposes of illustration, variations thereon may be made to provide grid dimensions suitable for the particular application.

Various methods of forming or manufacturing a lead acid battery are known and any such method may be used. One example of a method of forming or manufacturing a battery 100 is described in U.S. Pat. No. 9,379,378 which is hereby incorporated by reference in its entirety. As indicated, the respective grids for use in the battery 100 may be punched according to known methods for accomplishing such methods.

As illustrated and described herein, a novel battery grid 118, 120 is provided having various advantages. The battery grid may be a punched battery grid having a plurality of grid wires in a pattern arranged within a frame, the pattern being a pattern of grid wires which emanates from a radiant point, wherein the radiant point is located outside the boundary of the frame, and preferably above the top frame element. The battery grid provides a strong frame to preserve the strength of the grid, reducing the likelihood of premature failure and providing improved manufacturing characteristics. Further, the radial pattern described may optimize power distribution, delivery and recharge.

Advantageously, in some examples of embodiments a single stamped or punched grid may be optionally used for both positive and negative polarities, reducing the need for two different dies and lowering manufacturing costs. Additionally, such grids include a full frame (i.e., including top, bottom and side frame elements) adding strength to the positive and negative grid and reducing possible punctures of separators or glass mats due to exposed wires. In addition, the flat plate design described herein provides more grid integrity (strength) to allow processing and operation. Moreover, grid cross wires may be provided which extend all the way across the grid (e.g., the entire width of the grid) which provides increased structural strength to the grid and allows for the use of the grid material described herein (as well as in some examples, a reduction in width of the grid). In addition, in one or more examples of embodiments the grid provided herein has improved performance in manufacturing. Namely, the grid is easier to paste. In one example, the addition of a partial horizontal grid wire to the grid may provide improved ease of pasting during manufacture.

The battery 100 as described herein may be used or provided for any suitable purpose. Advantageously, the battery grid 118, 120 disclosed herein and battery 100 may be effective for both SLI ("starting, lighting, ignition") and deep cycle applications. One or more particular examples include a vehicle, such as an automobile, motorcycle, bus, recreational vehicle, boat, golf cart, and the like. The battery 100 may be configured to provide at least a portion of the power required to start or operate the vehicle and/or various vehicle systems (e.g., starting, lighting and ignition systems). Further, it should be understood that the battery 100 may be utilized in a variety of applications not involving a vehicle, and all such applications are intended to be within the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A grid for an absorbent glass mat lead acid battery comprising:
   a frame formed of a top frame element having a current collection lug, a first side frame element, a second side frame element, and a bottom frame element;
   the top frame element having a conductive section extended beneath the current collection lug and extended towards the bottom frame element for an increased current to the current collection lug;
   a plurality of grid wires, with at least one of the plurality of grid wires having an increased cross-sectional area over its length from a horizontal grid wire, proximate to the bottom frame element, to the top frame element, arranged in at least two radial configurations within the frame, with each of the at least two radial configurations emanating from separate radiant points, a first radiant point and a second radiant point, located outside a boundary of the frame and above the top frame element, the plurality of grid wires comprising:
      a first plurality of grid wires having first angles defined by a first intersection of each grid wire of the first plurality of grid wires with a radius line at the first radiant point such that the first plurality of grid wires provides for a first radial configuration;
      a second plurality of grid wires, separate from the first plurality of grid wires, having second angles defined by a second intersection of each grid wire of the second plurality of grid wires with the radius line at the second radiant point such that the second plurality of grid wires provides for a second radial configuration, with the radius line extended from the top frame element away from the bottom frame element and the radius line being at least substantially perpendicular to the top frame element;
      a distance between adjacent grid wires of the plurality of grid wires being increased in a direction of the first side frame element and the second side frame element starting at a radial grid positioned parallel to the first side frame element and the second side frame element;
   wherein the plurality of grid wires extended within a range of approximately 0.5 degrees to approximately 26.5 degrees from the radius line, with one of the plurality of grid wires extended parallel to the first side frame element and the second side frame element;
   wherein at least one of the plurality of grid wires joined to one of the first side frame element and the second side frame element; and
   wherein a number of the plurality of grid wires increases proximate to the top frame element;
   a plurality of horizontal grid wires in intersection with the plurality of grid wires arranged in the at least two radial configurations, wherein each of the plurality of horizontal grid wires continuously extends from the first side frame element to the second side frame element, the at least two radial configurations provide for an increase in a current capacity of the plurality of grid wires;
   a plurality of spaces defined by the first intersection and the second intersection and the respective intersections of the plurality of horizontal grid wires and the plurality of grid wires, with the plurality of spaces positioned to provide for a substantially equal potential across a width of the grid, and an area of each respective space of the plurality of spaces decreasing in proximity to the current collection lug, with a density of the plurality of spaces increasing proximal to the current collection lug;

the plurality of spaces being containment areas for an active material positioned on the frame, with an area of the plurality of spaces decreasing proximate to the current collection lug;

a quantity of the plurality of spaces increasing proximate to the current collection lug;

one partial horizontal grid wire separate from the plurality of horizontal grid wires and between the top frame element and the bottom frame element and in extension from one of the first side frame element with at least one of the plurality of spaces bifurcated by the partial horizontal grid wire;

wherein vertically extended grid wires are positioned between one of the plurality of horizontal grid wires and the bottom frame element;

the grid having a thickness with the thickness between 0.5 millimeters and 0.7 millimeters, with the first side frame element and the second side frame element having a thickness between 2 millimeters and 6 millimeters; and the grid, with the grid being one of a positive grid and a negative grid, being formed from 99.9-99.99% purity lead, wherein a combination the first plurality of grid wires and the second plurality of grid wires and, the plurality of grid wires and the 99.9-99.99% purity lead providing for an increase in a current transfer to the current collection lug.

2. An absorbent glass mat lead acid battery comprising:
a housing having a plurality of electrochemical cells formed by:
a plurality of positive plates each comprising the positive grid and a positive paste thereon;
a plurality of negative plates each comprising the negative grid and a negative paste thereon;
an absorbent glass mat interleaved between each positive plate and each negative plate;
an electrolyte retained by the absorbent glass mat; and
wherein one of the positive grid and negative grid comprises a respective grid of claim 1.

3. The absorbent glass mat lead acid battery of claim 2, wherein the positive grid and negative grid each comprise 99.9-99.99% purity lead.

4. The absorbent glass mat lead acid battery of claim 2, wherein the grid includes a partial horizontal grid wire immediately adjacent the top frame element.

5. The absorbent glass mat lead acid battery of claim 2, wherein the grid is formed by casting a strip of lead and punching the strip to remove material.

6. The absorbent glass mat lead acid battery of claim 2, wherein the radially extending grid wires extend within a range of approximately 0.5 degrees to approximately 26.5 degrees from an imaginary line extending perpendicular to top frame of the grid.

7. The absorbent glass mat lead acid battery of claim 6, wherein each of the separate radiant points is on the radius line running through an imaginary line perpendicular to the top frame element.

8. A lead acid battery wherein both a second positive grid and a second negative grid comprise the grid of claim 1.

9. The grid of claim 1, wherein the grid is formed by casting a strip of lead and punching the strip to remove material.

10. A grid for an absorbent glass mat lead acid battery comprising:

a frame formed of a top frame element having a current collection lug, a first side frame element, a second side frame element, and a bottom frame element;

a plurality of grid wires, with at least one of the plurality of grid wires having an increased cross-sectional area over its length from a horizontal grid wire, proximate to the bottom frame element, to the top frame element, arranged within the frame, with the plurality of grid wires in extension from the top frame element and being arranged in at least two radial configurations within the frame, with each of the at least two radial configurations emanating from separate radiant points, a first radiant point and a second radiant point, located outside a boundary of the frame and above the top frame element, the plurality of grid wires comprising:
a first plurality of grid wires having first angles defined by a first intersection of each grid wire of the first plurality of grid wires with a radius line at the first radiant point such that the first plurality of grid wires provides for a first radial configuration;
a second plurality of grid wires, separate from the first plurality of grid wires, having second angles defined by a second intersection of each grid wire of the second plurality of grid wires with the radius line at the second radiant point such that the second plurality of grid wires provides for a second radial configuration, with the radius line extended from the top frame element away from the bottom frame element and the radius line being at least substantially perpendicular to the top frame element; and
wherein a number of the plurality of grid wires increases proximate to the top frame element;

a plurality of horizontal grid wires crossing the plurality of grid wires arranged in the at least two radial configurations, wherein each of the plurality of horizontal grid wires continuously extends from the first side frame element to the second side frame element;

a plurality of spaces defined by the first intersection and the second intersection and the respective intersections of the plurality of horizontal grid wires and the plurality of grid wires, with the plurality of spaces positioned to provide for a substantially equal potential across a width of the grid, and an area of each respective space of the plurality of spaces decreasing in proximity to the current collection lug;

one partial horizontal grid wire separate from the plurality of horizontal grid wires and immediately adjacent the top frame element and in extension from one of the first side frame element for ⅓ of a top frame element length of the top frame element towards the second side frame element, with at least one of the plurality of spaces bifurcated by the one partial horizontal grid wire;

the grid having a thickness with the thickness between 0.5 millimeters and 0.7 millimeters; and the grid being formed from 99.9-99.99% purity lead.

11. The grid of claim 10, wherein the grid is a positive grid.

12. The grid of claim 10, wherein the grid is a negative grid.

13. The grid of claim 10, wherein the grid is formed by casting a strip of lead and punching the strip to remove material.

14. The grid of claim 10, wherein the plurality of grid wires extend within a range of approximately 0.5 degrees to approximately 26.5 degrees from the radius line extending perpendicular to the top frame element, with one of the plurality of grid wires extended parallel to the first side frame element and the second side frame element.

15. The grid of claim 10, wherein a number of the spaces increases proximal to the current collection lug.

16. The grid of claim 10, wherein vertically extended grid wires are positioned between horizontal grid wire proximate to the bottom frame element and the bottom frame element.

17. The grid of claim 10, wherein at least one of the plurality of grid wires joined to one of the first side frame element and the second side frame element.

18. The grid of claim 10, wherein the plurality of spaces are containment areas for an active material positioned on the frame, with an area of the plurality of spaces decreasing proximate to the current collection lug and a quantity of the plurality of spaces increasing proximate to the current collection lug.

\* \* \* \* \*